United States Patent
Heyer

[15] 3,669,094

[45] June 13, 1972

[54] DEVICE AND METHOD FOR MEASURING INTRACRANIAL PRESSURE

[72] Inventor: William T. Heyer, Santa Barbara, Calif.

[73] Assignee: Heyer-Schulte Corporation, Santa Barbara, Calif.

[22] Filed: July 6, 1970

[21] Appl. No.: 52,654

[52] U.S. Cl. .................................................128/2, 128/350
[51] Int. Cl. ...............................................A61b 5/00, A61m 27/00
[58] Field of Search ..............128/2, 348, 349 B, 349 BV, 128/350

[56] References Cited

UNITED STATES PATENTS 2,930,378  3/1960  Buyers .............................. 128/350 R
3,128,769  4/1964  Scislowicz ........................... 128/348
3,333,588  8/1967  Schulte ............................. 128/350 R

OTHER PUBLICATIONS

" A Ventriculostomy Reservoir," In British Medical Journal, p. 173, July 18, 1964.

Primary Examiner—Channing L. Pace
Attorney—Angus & Mon

[57] ABSTRACT

A physiological drainage catheter and a method of using the same to provide a means for measuring intracranial pressure without substantially affecting the existing pressure by introduction of the measuring and drainage means.

8 Claims, 6 Drawing Figures

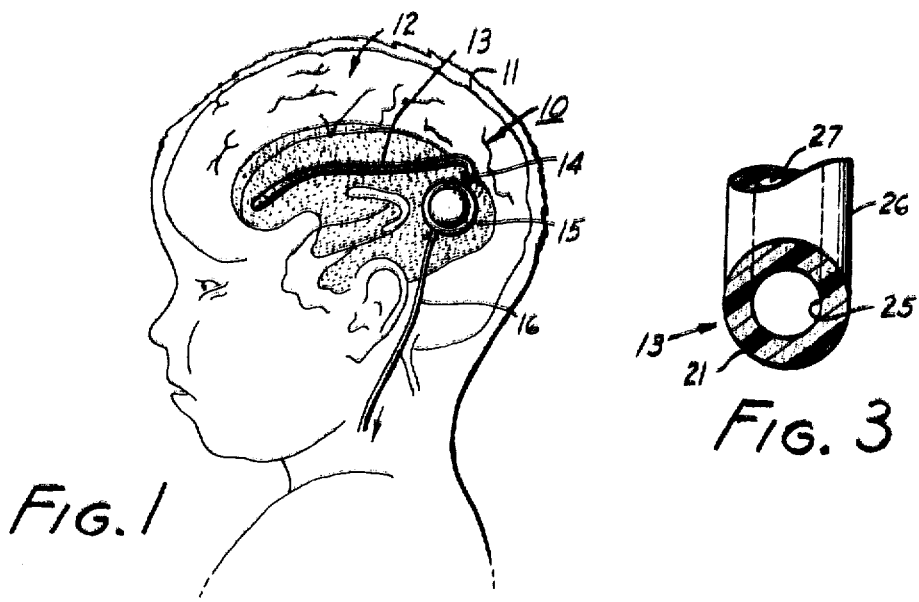
FIG. 1
FIG. 3
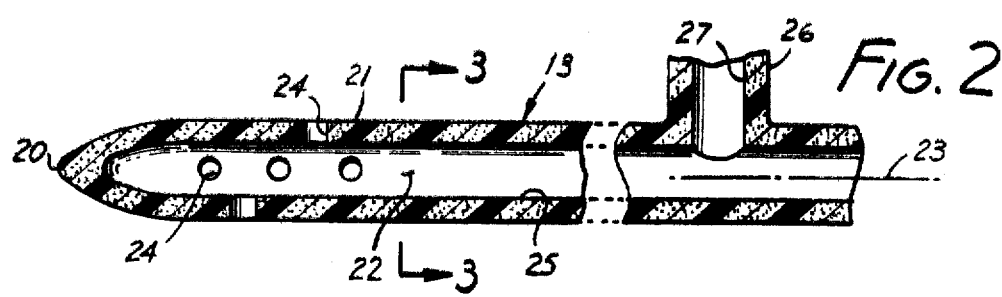
FIG. 2
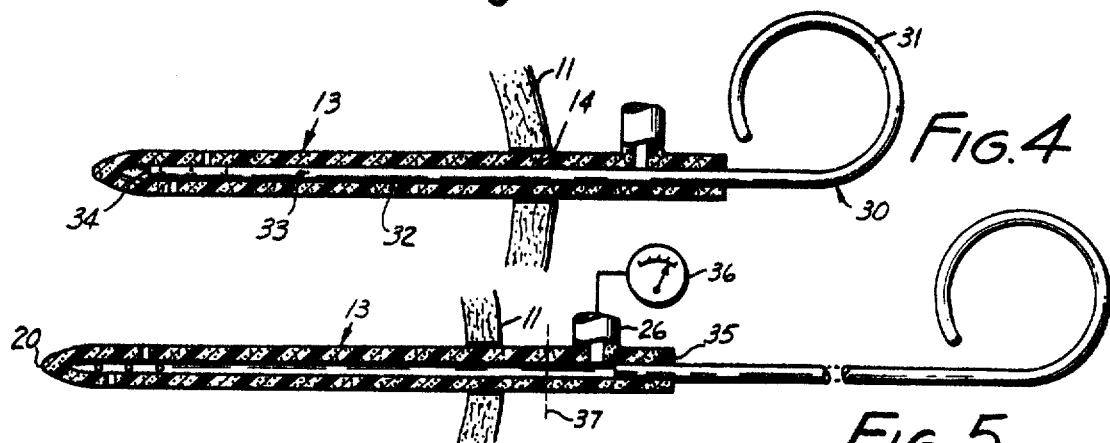
FIG. 4
FIG. 5
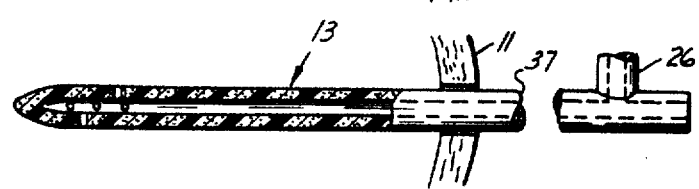
FIG. 6
INVENTOR.
WILLIAM T. HEYER
BY Angus & Mon
ATTORNEYS.

DEVICE AND METHOD FOR MEASURING INTRACRANIAL PRESSURE

This invention relates to a physiological drainage catheter, including means to enable intracranial pressure to be measured without substantially affecting the pressure in the region being measured, together with a method for accomplishing this objective.

Drainage catheters for use in the human body are widely used in various applications, perhaps the best known of which is the drainage of fluids from the cranium of a child afflicted with hydrocephalus. These devices are customarily thrust into the ventricles of the brain where openings through the catheter permit drainage of the fluid to some region where the fluids are disposed of, such as in the heart.

The intracranial pressure is a matter of considerable importance in the treatment of the hydrocephalus. It is important that the pressure not be reduced to an abnormally low level, and it is of interest to determine what the initial level would be. Unfortunately, the existing techniques for inserting catheters have ordinarily involved the loss of substantial ventricular fluid, and with this loss, of course, there has been a drop in pressure such that the original intracranial pressure was not known and, worse, was not discoverable. Still another problem in the prior art of measuring intracranial pressure is the fact that the insertion of a body such as a sensor into a region already overtaxed by liquids under pressure to the extent that the brain itself has begun to be shrunk, or the skull distended, affects the pressure by changing the volume of relatively incompressible material within an enclosure, ie., the cranium. Accordingly, an element of uncertainty is introduced into the measurements simply by the introduction of the measuring instrument itself.

It is an object of this invention to provide a means of inserting a catheter whereby the net volume of the catheter itself will not have an adverse effect upon the pressure in the region to be measured, to provide a catheter with means for attachment of measuring devices, and to provide for a means of insertion of the catheter followed by the steps of a pressure measurement and discarding of surplus portions of the catheter itself.

A physiological drainage catheter according to this invention comprises an elongated drainage tube with a central drainage passage extending along a central axis, a peripheral wall bounding said passage, an entry port passing through the wall to the central passage, and a branch tube integrally formed with the drainage tube and having a branch passage therein, opening in fluid communication to the drainage passage.

According to a preferred feature of the invention, an insertion rod is provided which has an outer diameter substantially equal to the inner diameter of the drainage passage, such that the rod is slidable therein. It makes a close fit with the peripheral walls so as to close the inlet port and the branch passage when opposed to their openings in said peripheral wall. Then the catheter can be inserted into the body by a means of an endwise axial force exerted on the tip by the rod, and the passages will remain closed during that time. After the catheter is placed, the rod may be withdrawn to open and interconnect the inlet port and branch passage, while keeping the drainage passage closed on the side of the branch passage opposite from the tip so as to enable pressure in the cranium to be measured at the branch passage.

According to still another preferred, but optional, feature of the invention, the dimensions of the catheter are selected such that the net volume of the catheter inserted into the cranium is substantially equal to the volume of the brain passage and branch passage outside the skull, whereby no net change of material volume is caused in the cranium as a consequence of insertion of the catheter into the fluid-filled body cavity (the space between the cranium and the brain).

Still another feature of the invention resides in the method of inserting the catheter with the rod by exerting the axial endwise force, withdrawing the rod to interconnect the two passages, and taking a pressure reading at the branch passage prior to cutting the drainage tube a a location such that the branch tube is discarded.

The above and other features of this invention will be fully understood from the following detailed description and the accompanying drawings in which:

FIG. 1 shows the presently preferred embodiment of the invention installed in the head of a child suffering from hydrocephalus;

FIG. 2 is a fragmentary axial cross-section of the presently preferred embodiment of the invention;

FIG. 3 is a cross-section taken at line 3—3 of FIG. 2;

FIG. 4 shows the device of FIG. 2 being inserted into the cranium;

FIG. 5 shows a sequential measuring step and

FIG. 6 shows a final cutting and discarding operation.

FIG. 1 shows a drainage system 10 installed in the cranium 11 of a child. The child's brain 12 is shown in general schematic notation, and a catheter 13, according to the invention, is thrust through a hole 14 formed in the skull into the ventricles of the brain so as to drain excess fluid therefrom.

A pump 15 of the general type shown in Schulte U.S. Pat. No. 3,111,125, issued Nov. 19, 1963, is placed against the outside of the skull beneath the scalp and accepts fluid from the physiological drainage catheter and discharges it into a shunt tube 16, which is only incompletely shown, but which leads to some other region of the body, such as the heart, to dispose of the fluid. A shunt tube of this general classification forms no part of this invention, but for general information, it is shown in Heyer U.S. Pat. No. 3,020,913 issued Feb. 13, 1962. This shunt tube customarily includes a check valve means, and the pump itself also comprises check valve means, the combination assuring a unidirectional flow from the ventricles of the brain to the region into which the fluid is discharged. The pump, which is optional, provides pumping means.

It is the purpose of this invention to permit intracranial pressure to be measured in the region of tip 20 of catheter 13. It is evident that since the brain is already compacted by excess fluid, and that this fluid exerts pressure against the cranium so as to distend the same, insertion of still another solid object will change the pressure unless steps are taken to prevent this change. It is further obvious that it is desirable to avoid loss of fluid as much as possible should an accurate pressure reading be desired. This invention accomplishes these objectives.

Catheter 13 is best shown in FIG. 2. It includes a drainage tube 21 having a drainage passage 22 extending axially along an axis 23. Tip 20 is shown, and spaced somewhat from it, is a plurality of inlet ports 24 which opens onto the peripheral wall 25 of the tube. These inlet ports thereby provide perforations to permit flow of fluid from the outside of the tube into the drainage passage.

A branch tube 26 is formed integrally with the drainage tube and has a branch passage 27 opening on wall 25. It is spaced from the inlet ports and on the opposite side therefrom from the tip.

The catheter structure is readily molded from medical grade silicone rubber, is generally flexible, and is nonreactive with body tissue.

An insertion rod 30 (FIG. 4) includes a handle loop 31, and extended length 32 with an outer cylindrical surface 33 and has an outer diameter substantially equal to the inner diameter of the cylindrical peripheral wall 25 so that it may readily be slidable in the peripheral wall but is in close, nearly fluid-sealing contact therewith. It will be noted in the position of FIG. 4 that when end 34 of rod 30 is past the inlet ports toward the tip, the inlet ports and also the branch passage are closed by this rod.

With the insertion rod in this position, it is pushed to exert an endwise axial force on the tip end of the catheter so as to press it through hole 14 and through the brain to the desired terminal location for the tip. At this time, the insertion rod is withdrawn to the position shown in FIG. 5 which will permit fluid to flow into the drainage passage and into the branch passage, but not through the end 35 of the drainage tube.

Therefore, a pressure gauge 36 may be connected to the branch tube and will reliably measure the intracranial pressure.

The depth of insertion of catheters of this class are generally approximately known, and catheters of this sort are generally provided in excess length so that they can be snipped off at any desired length before being connected to the pump. One may readily approximate the net volume (of silicone rubber) of the catheter in the intracranial region by calculating the cross-section area of the tube and multiplying it by the length with appropriate correction for the particular shape of the tip and the volume occupied by the entry ports. This net volume must be compensated for by removing to regions outside the cranium but within the pressure-measuring system an equal amount of fluid unless a net change of pressure is to be caused in the cranium. Accordingly, one may readily select the location along the branch tube at which the pressure gauge is to be attached so that the volume of the branch passage used and of the drainage passage outside the cranium will approximately equal the net volume of catheter inside the cranium. Then no substantial uncertainty will be introduced into the measurement, and such as may exist will be well within the tolerance limits of measurement.

The foregoing thereby provides a ready means for accurately determining the initial intracranical pressure, which is a pressure reading quite important to the individual patient. After this is done, the drainage tube may be pinched off at any location such as location 37 in FIG. 5 and cut at that point, and then this cut portion connected to the pump in the manner described in the aforesaid Schulte patent. The branch tube with the remainder of the drainage tube will be discarded.

This invention thereby provides a ready means for insertion of a physiological drainage catheter, a means for measuring intracranial pressure without uncertainty derived from insertion of the measuring instrument, and a device and technique which causes little risk of loss of fluid, because the compressed material of the brain near the skull will tend to seal around the catheter upon its insertion so as to prevent loss at that point.

This invention is not to be limited by the embodiment shown in the drawing and described in the description which is given by way of example and not of limitation but only in accordance with the scope of the appended claims.

I claim:

1. A physiological drainage catheter for use in measuring fluid pressure in an enclosed body cavity, comprising an elongated drainage tube with a tip end, a central drainage passage extending along a central axis, a peripheral inner wall bounding said passage, a peripheral outer wall bounding said tube, an entry port passing through the walls to the central passage, and a branch tube integrally formed with the drainage tube spaced from the entry port on the opposite side thereof from the tip end and having a branch passage therein in fluid communication with the drainage passage, said branch tube being adapted to be connected to a means for measuring pressure in said passages, said means terminating said branch passage, the outer surface of the tip and that portion of the outer wall which is intended to be inserted into the cavity enclosing a first volume which is substantially equal to a second volume defined by the entry port, branch passage, and the inner wall from the tip end to its junction with the branch passage, whereby the fluid which is displaced by insertion of the tube in the amount of the first volume can be received substantially totally in the region defined as the second volume, so that pressure in the cavity as measured in the branch passage will not have been changed substantially from the pressure in the cavity prior to insertion of the tube.

2. A physiological drainage catheter according to claim 1 in which the catheter is flexible.

3. In combination: a physiological drainage catheter for use in measuring fluid pressure in an enclosed body cavity, comprising an elongated drainage tube with a tip, a central drainage passage extending along a central axis, a peripheral wall bounding said passage and having an inner diameter, a peripheral outer wall bounding said tube, an entry port passing through the walls to open into the drainage passage, and a branch tube integrally formed with the drainage tube and having a branch passage therein opening into the drainage passage at a point spaced from the entry port and on the opposite side thereof from the tip, and an insertion rod having an outer diameter substantially equal to the said inner diameter such that the rod is slidable therein, but makes a close fit with said peripheral wall so as to close said inlet port and said branch passage when opposed to their opening onto said peripheral wall, said branch tube being adapted to be connected to a means for measuring pressure in said passages, said means terminating said branch passage, the outer surface of the tip, and that portion of the outer wall which is intended to be inserted into the cavity enclosing a first volume which is substantially equal to a second volume defined by the entry port, branch passage, and the inner wall from the tip end to its junction with the branch passage, whereby the fluid which is displaced by insertion of the tube in the amount of the first volume can be received substantially totally in the region defined as the second volume, so that pressure in the cavity as measured in the branch passage will not have been changed substantially from the pressure in the cavity prior to insertion of the tube, whereby the catheter can be inserted into the body by means of an endwise axial force exerted on the tip by the rod, and the passages remain closed, and after the catheter is placed, the rod may be withdrawn to open and interconnect the inlet port and branch passage while closing the drainage passage on the side of the branch passage opposite from the tip so as to enable pressure in the cranium to be measured in the branch passage.

4. A combination according to claim 3 in which both tubes are flexible, whereby either may be pinched to shut off fluid flow therethrough.

5. A combination according to claim 4 in which the tubes are made of medical grade silicone rubber.

6. The method, utilizing a flexible drainage catheter having a tip, a peripheral inner wall defining a drainage passage extending along a central axis, a peripheral outer wall an inlet port passing through the walls and opening into said drainage passage, a branch tube integral with the drainage tube having a branch passage opening into the drainage passage through the peripheral wall at a location spaced from the entry port, and a rod making an axially sliding close fit with the peripheral wall so as to close the inlet port and the branch passage when positioned contiguous to them, of inserting a physiological drainage catheter into an enclosed body cavity and measuring the fluid pressure in said cavity prior to draining the same, comprising the following steps in the order recited:

a. inserting the rod into the drainage passage so that it abuts the tip and is capable of exerting an endwise axial force thereon, b. inserting the catheter into a region to be drained by exerting said endwise axial force on the rod in order to press the tip through the body to a desired location in said cavity, c. leaving the catheter in place and withdrawing the rod until its end is on the side of the branch tube opposite from the tip, and d. measuring the fluid pressure in the branch tube.

7. A method according to claim 6 succeeded by the following additional step:

e. cutting the drainage tube between the branch tube and the tip and discarding the portion which is cut off.

8. The method according to claim 6, comprising admitting to the passages fluid in a volume substantially equal to the volume displaced by the outer boundary of that portion of the catheter which is inserted into the cavity.

* * * * *

PO-1050
(5/69)

UNITED STATES PATENT OFFICE
CERTIFICATE OF CORRECTION

Patent No. 3,669,094  Dated June 13, 1972

Inventor(s) WILLIAM T. HEYER

It is certified that error appears in the above-identified patent and that said Letters Patent are hereby corrected as shown below:

Col. 2, line 1,    "a a" should read --at a --

Col. 2, line 14,   "step" should read --step;--

Col. 2, line 59,   "and" should read --an--

Col. 4, line 42,   "wall" should read --wall,--
Claim 6, line 3

Signed and sealed this 12th day of November 1974.

(SEAL)
Attest:

McCOY M. GIBSON JR.                C. MARSHALL DANN
Attesting Officer                  Commissioner of Patents